Figures 1, 3:
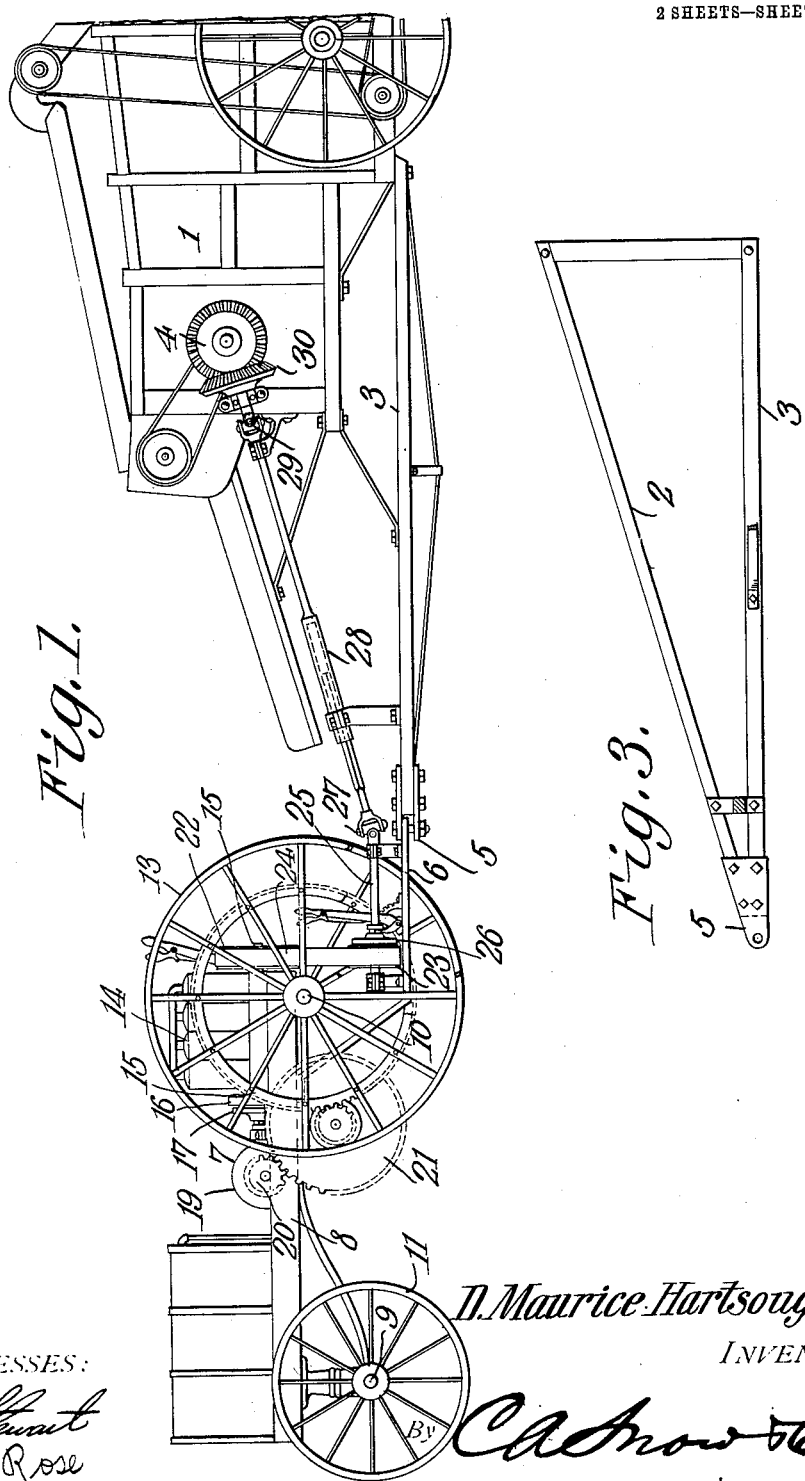

No. 848,990. PATENTED APR. 2, 1907.
D. M. HARTSOUGH.
TRANSIT THRESHING MACHINE.
APPLICATION FILED DEC. 27, 1906.

2 SHEETS—SHEET 1.

WITNESSES:
E. W. Stewart
A. M. Rose

D. Maurice Hartsough,
INVENTOR.
By C. A. Snow & Co.
ATTORNEYS

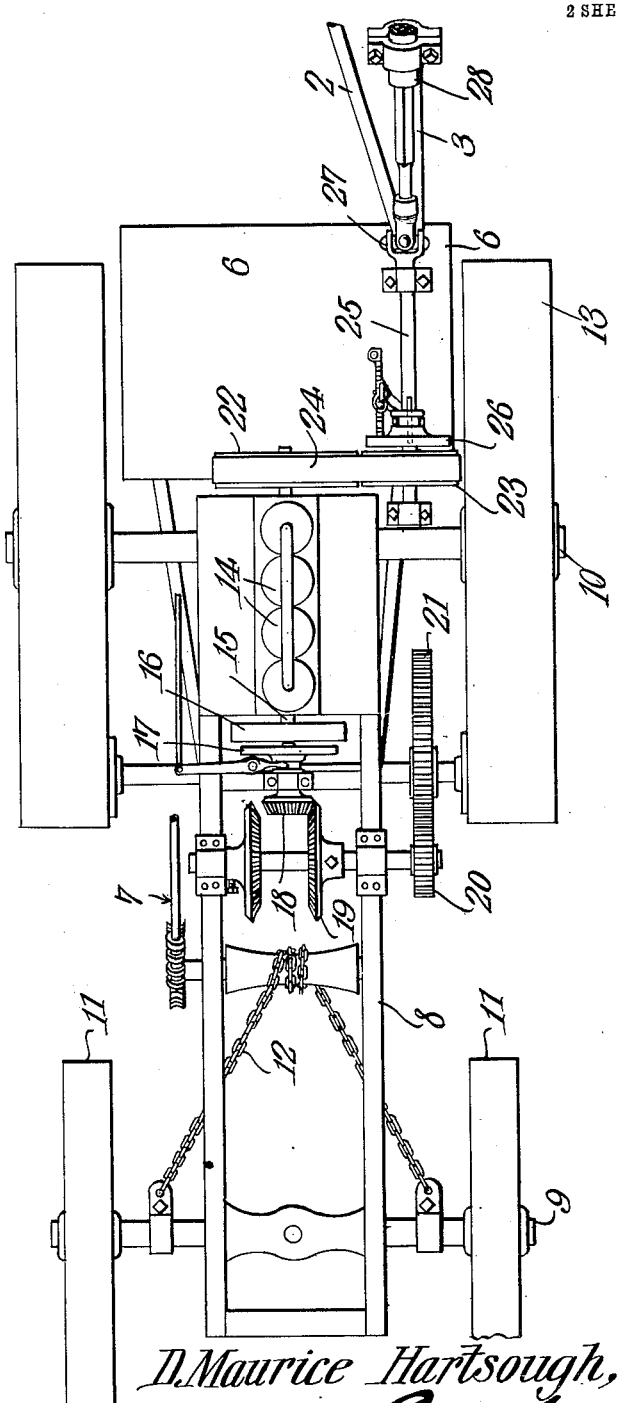

UNITED STATES PATENT OFFICE.

D MAURICE HARTSOUGH, OF MINNEAPOLIS, MINNESOTA, ASSIGNOR OF ONE-HALF TO PATRICK J. LYONS, OF STEEL, NORTH DAKOTA.

TRANSIT THRESHING-MACHINE.

No. 848,990.     Specification of Letters Patent.     Patented April 2, 1907.

Application filed December 27, 1906. Serial No. 349,695.

*To all whom it may concern:*

Be it known that I, D MAURICE HARTSOUGH, a citizen of the United States, residing at Minneapolis, in the county of Hennepin and State of Minnesota, have invented a new and useful Transit Threshing-Machine, of which the following is a specification.

This invention has relation to machines for threshing grain while in transit; and it consists in the novel construction and arrangement of its parts, as hereinafter shown and described.

The object of the invention is to provide a thresher and a prime mover for drawing the same over a field. Means is provided for transmitting movement from the prime mover to the cylinders of the threshing-machine. The means last-above mentioned is of special construction and arrangement and is adapted particularly for the application above alluded to. The parts are so assembled and arranged that the thresher may operate while in transit or may be operated when stationary, the advantage of which is that the thresher may be drawn over the field and the grain may be threshed without having to be brought into a central point. Consequently much labor is saved in unnecessarily handling the bulkier part of the crop.

In the accompanying drawings, Figure 1 is a side elevation of the prime mover and the forward end of a thresher, showing the coupling means and motion-transmission device. Fig. 2 is a top plan view of the prime mover and a portion of the coupling means, and Fig. 3 is a top plan view of the coupling means.

The thresher 1 may be of any usual or approved pattern. It is, however, provided at its forward end with a coupling-frame 2, which is substantially triangular and having the longer side 3 in vertical alinement with the gear-wheel 4, which in turn is attached to the shaft of the initial cylinder of the thresher 1. The forward end of the coupling-frame 2 is provided with a clevis 5, which in turn is coupled to the frame 6 of the prime mover 7. The said prime mover 7 comprises a frame 8, mounted upon the axles 9 and 10. The steering-wheels 11 are journaled upon the axle 9, and suitable steering-gear 12 is provided for the said axle 9. The traction-wheels 13 are mounted upon the axle 10. The engines 14 are mounted upon the frame 8, and the engine-shaft 15 is provided with a fly-wheel 16, against which the friction-clutch 17 is adapted to operate. Through a chain of gears 18, 19, 20, and 21 rotary movement may be transmitted from the fly-wheel 16, through friction-clutch 17, to the traction-wheels 13. The belt-wheel 22 is fixed to the rear end of the engine-shaft 15, and the belt-pulley 23 is journaled to the frame 6 below and to one side of the belt-wheel 22. The pulley 23 is in vertical alinement with the point upon frame 6 with which the frame 2 couples. The belt 24 surrounds the wheels 22 and 23. The shaft 25 is journaled in alinement with the center of the pulley 23 and is provided with the friction-clutch 26, which is adapted to laterally engage and disengage the pulley 23. The shaft 25 is provided with a knuckle-joint 27, which is located directly above the coupling-point between the frames 6 and 2. The sleeve 28 is journaled upon the frame 2, and the end of the shaft 25 enters the end of the sleeve 28 and is adapted to slip longitudinally therein. The sleeve 28 is provided with a knuckle-joint 29, and the bevel-pinion 30 is attached to the end of the sleeve 28 and meshes with the wheel 4 of the thresher 1.

From the foregoing description it is obvious that as the motor and thresher pass over the ground the vertical play provided at the clevis 5 will compensate and allow for unevenness of the ground or the difference in altitude of the two devices. In view of the fact that the knuckle-joint 27 is directly above the point of pivotal connection between the frames 2 and 6 difference in alinement between the motor and the thresher is compensated for. Such difference in alinement occurs when the device as an entirety is making a turn. The slip-joint connection provided between the shaft 25 and the sleeve 28 compensates for any increase or decrease of difference of space between the motor and the thresher and at the same time assures the transmission of rotary motion from the motor to the thresher. The knuckle-joint 29 compensates for any difference in alinement that may take place in the major portion of the sleeve 28 with relation to the center of the wheel 4. It will also be observed that by simply throwing the clutch 17 into engagement with the fly-wheel 16 the motor and thresher will travel simultaneously, but the thresher will not be in threshing operation; but by throwing the clutch 26 into engagement with the pulley 23 rotary movement will be transmitted along shaft 25, sleeve 28, and through wheel 30 to the wheel 4. By moving the clutch 17 out of engagement with the fly-wheel 16 and allowing the clutch 26 to remain in engagement with the pulley 23 the motor and the thresher will be at rest, but the threshing parts of the thresher will be in operation, as above described.

Having described my invention, what I claim as new, and desire to secure by Letters Patent, is—

A transit thresher comprising a prime mover and a thresher, a triangular coupling-frame attached at its short side to the thresher and having its long side substantially in alinement with the initial power-wheel of the operating parts of the thresher, said coupling-frame being coupled at the angle formed by its long side and the hypotenuse to the frame of the prime mover, a shaft journaled upon the prime mover and having a knuckle-joint located above the point of connection between the frames, said shaft being operatively connected with the initial power-wheel of the operating parts of the thresher and also being operatively connected with the engines of the prime mover.

In testimony that I claim the foregoing as my own I have hereto affixed my signature in the presence of two witnesses.

D MAURICE HARTSOUGH.

Witnesses:
W. H. GOULD,
W. M. GILLIGAN.